June 11, 1940.   A. A. VATER ET AL   2,204,389
APPARATUS FOR WEIGHING LIVESTOCK
Filed April 2, 1938   2 Sheets-Sheet 1
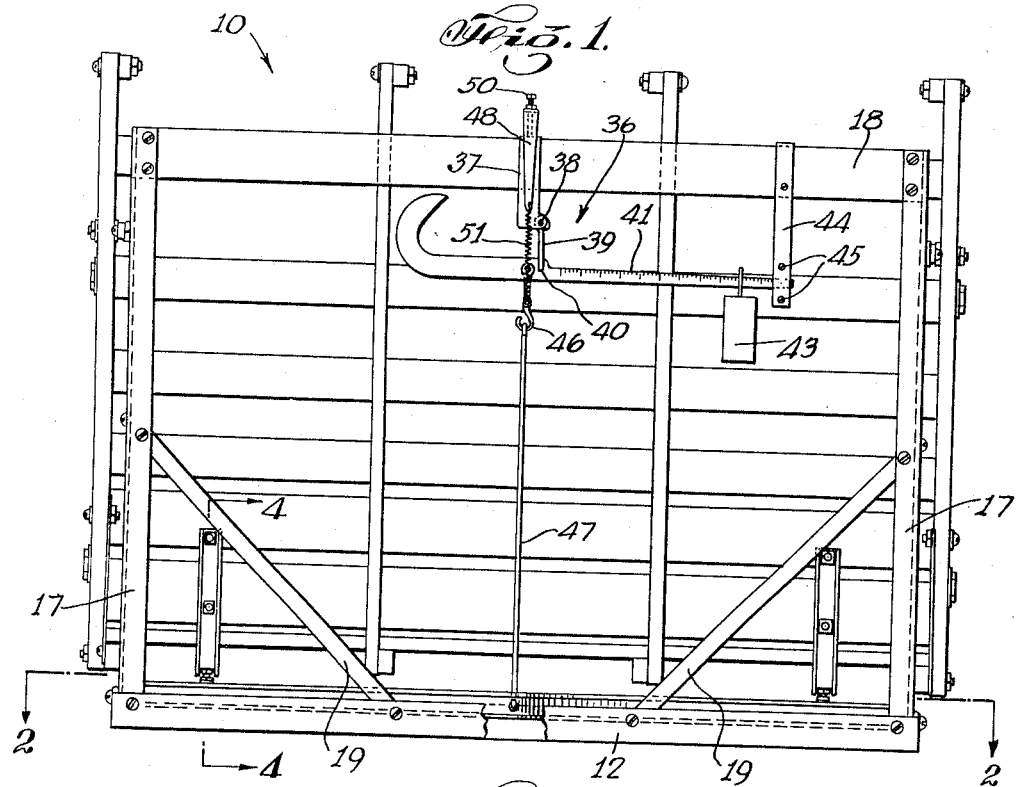
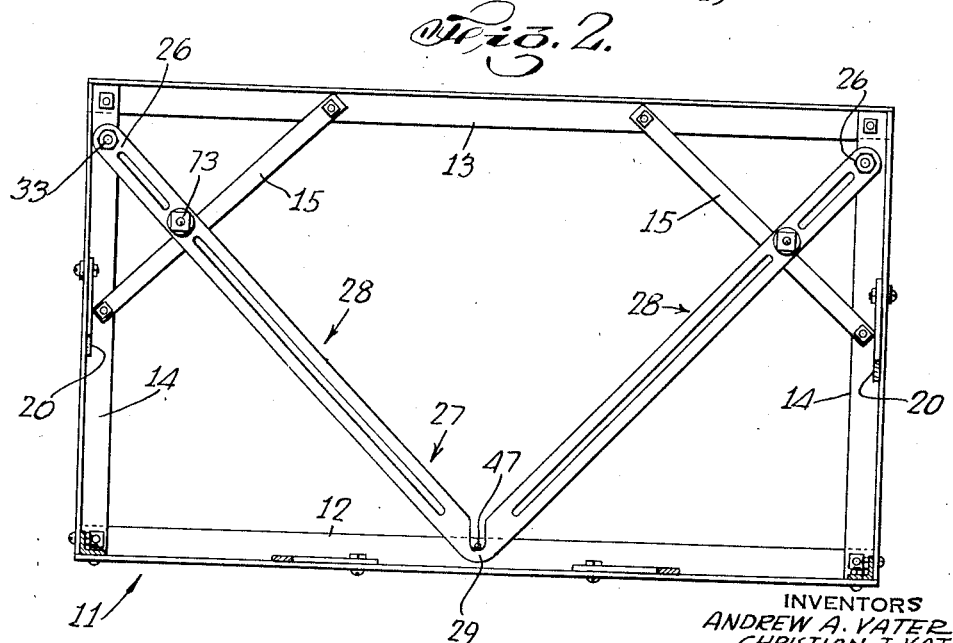
INVENTORS
ANDREW A. VATER
CHRISTIAN J. VATER
BY Carl Miller
ATTORNEY June 11, 1940.   A. A. VATER ET AL   2,204,389
APPARATUS FOR WEIGHING LIVESTOCK
Filed April 2, 1938   2 Sheets-Sheet 2

INVENTORS
ANDREW A. VATER
CHRISTIAN J. VATER
BY Carl Miller
ATTORNEY

Patented June 11, 1940

2,204,389

UNITED STATES PATENT OFFICE 2,204,389

APPARATUS FOR WEIGHING LIVESTOCK

Andrew A. Vater, Art, and Christian J. Vater, Mason, Tex.

Application April 2, 1938, Serial No. 199,616

4 Claims. (Cl. 265—49)

This invention relates to apparatus for weighing livestock.

An object of this invention is to provide apparatus of the character described, which shall be rugged, strong, compact, easy to use, relatively inexpensive to manufacture, positive in operation, and yet practical and efficient to a high degree.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

In the accompanying drawings, in which is shown one of the various possible illustrative embodiments of this invention, Fig. 1 is a front elevational view of apparatus embodying the invention;

Fig. 2 is a cross-sectional view taken on line 2—2 of Fig. 1;

Figure 4:
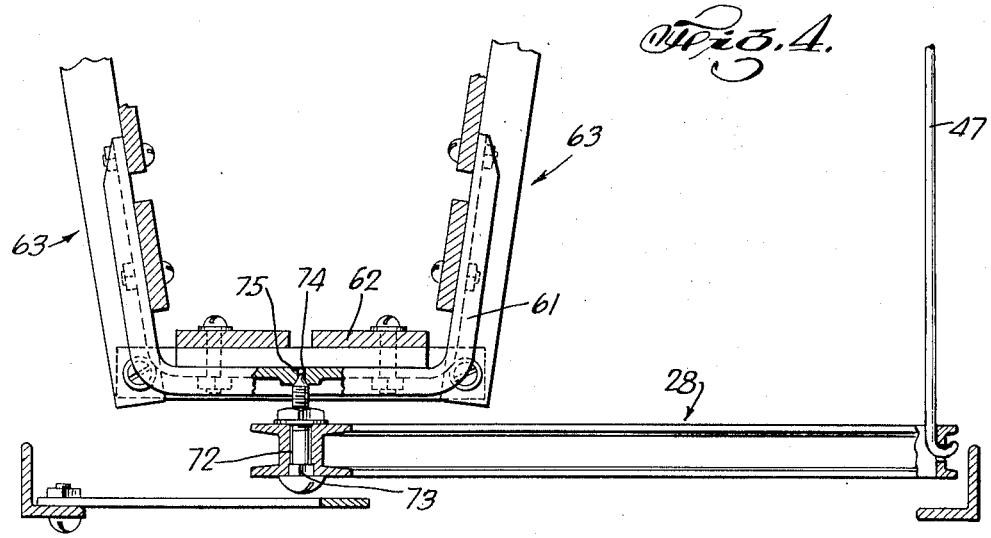
Fig. 4 is a cross-sectional view taken on line 4—4 of Fig. 1.

Referring now in detail to the drawings, 10 designates apparatus embodying the invention for weighing livestock animals or other articles. The same comprises a rectangular bottom frame 11, comprising a front portion 12 and a rear portion 13, and end portions 14.

The portions 12, 13 and 14 are of angle shaped, transverse cross-section, and are bolted or riveted together at the corners in any suitable manner. Each has a bottom inwardly extending horizontal wall, and an upwardly extending vertical wall. The side portions 14 may be connected to the rear portion 13, by inclined braces 15.

Attached to the front corners of the frame 11, are a pair of upstanding posts or members 17, which may likewise be made of angle shaped bars. The upstanding members 17 are interconnected at the top by a horizontal bar 18. Said members 17 are interconnected to the front portion 12 of the frame, by inclined braces 19, and to the side portions 14, by inclined braces 20.

Figure 3:
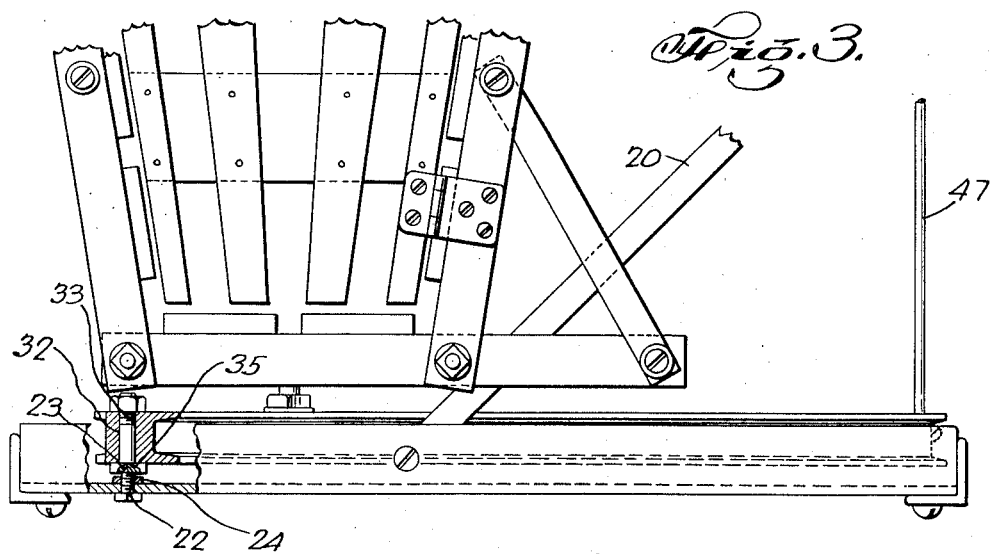
Fig. 3 is an end elevational view of the improved apparatus with parts in cross-section.
Figure 5:
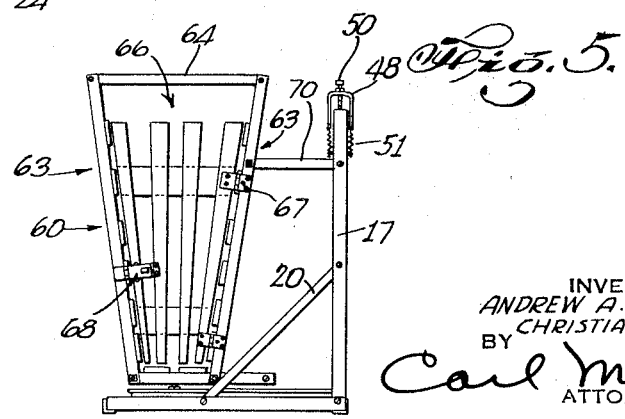
Fig. 5 is an end elevational view of the apparatus.

Screwed to the horizontal walls of the side portions 14, and disposed adjacent the rear portion 13, of the frame 11, are screws 22 having pointed upper ends 23. Each screw may be provided with a lock nut 24, as shown in Fig. 3 of the drawings.

Supported for pivotal movement on the pointed upper ends 23, of the screws 22, are the rearward ends 26 of a V-shaped member 27. Said member 27 has a pair of rearwardly and outwardly inclined arms 28. The apex 29 of member 27 may be located directly beneath bar 18. The outer ends of arms 28 are formed with through openings 32, each of which receives a bolt 33 formed with a countersunk V-shaped opening 35, at its lower end, receiving the pointed upper end 23, of one of the screws 22.

It will now be understood that the V-shaped member 27 may be tilted up or down about the outer ends of the arms 28 which engage the screws 22.

Means is provided for connecting the apex end 29 of member 27 to scale mechanism 36, mounted on the bar 18. To this end, there is fixed on bar 18, a bracket 37 provided with a horizontal pin 38 disposed below said bar. Engaging the pin 38, is a hook 39 provided with a knife edge bearing 40, at its lower end, to pivotally support a weighing beam or steel yard 41. On the steel yard may be hung the usual weight 43. Attached to the bar 18, is a guide 44, provided with a pair of parallel pins 45, between which the outer end of the beam is received. Attached to the beam 41, is a hook 46, connected by a link 47 to the apex portion 29 of member 27.

Straddling the bracket 37 is a yoke 48, adjustable vertically with respect to said bracket by a central screw 50. The lower ends of the arms of yoke 48 are connected by springs 51 to opposite sides of the hook 46.

Supported on intermediate portions of the arms 28 of the V-shaped member 27, is a crate 60 in which the animals may stand while being weighted. Said crate 60 comprises a plurality of similar, parallel, U-shaped brackets 61, supporting bottom flooring 62, and front and rear upwarly and outwardly inclined walls 63. The flooring 62 and walls 63 may be made of parallel slats of wood, or in any other suitable manner. The upper ends of walls 63 may be interconnected by members 64 to strengthen the crate. At the ends of the crate are doors 66, preferably hinged to the ends of the front wall 63 on hinges 67, and adapted to be held in closed position by latches 68.

When weighing the animals, one door is opened to let the animal in, and then said door is closed. After the weighing operation, the other door is opened to let the animal out. The crate 60 may be connected to the posts 17 by substantially horizontal links 70.

The manner of supporting the crate on the arms 28 of member 27 will now be described:

Each arm 28 is formed, mediately the ends thereof, with a vertical through opening 72 to receive a bolt 73 fixed to said arm. Each bolt has a pointed upper end 74. The middle of the bottom portion of each bracket 61 is formed with an opening 75 to receive the upper point of one of the bolts 73.

It will now be understood that the crate 60 is supported on intermediate portions of the arms 28. The distance between each bolt 73 and adjacent bolt 33, is preferably ⅕ the length of each arm 28, whereby the weight of the animal weighed on the machine, is five times the weight indicated on the weighing beam 41. Obviously, the bolt 73 may be located in any suitable position on the arms 28, it being understood, that the scale reading on the weighing beam 41 is multiplied according to the ratio of the full length of the arm 28, to the length between the bolts and the outer pivotal points of the arms 28.

It will thus be seen that there is provided a device in which the several objects of this invention are achieved, and which is well adapted to meet the conditions of practical use.

As various possible embodiments might be made of the above invention, and as various changes might be made in the embodiment above set forth, it is to be understood that all matter herein set forth or shown in the accompanying drawings is to be interpreted as illustrative and not in a limiting sense.

Having thus described our invention, we claim as new and desire to secure by Letters Patent:

1. Apparatus of the character described, comprising a bottom frame, a pair of vertical posts on said frame, a bar interconnecting the upper ends of said posts, a horizontal V-shaped member, means for pivotally connecting the outer ends of the arms of said V-shaped member to said frame, weighing mechanism interconnecting the apex of said V-shaped member with said bar, a crate adapted to receive animals, supported on intermediate portions of the arms of said V-shaped member, and links interconnecting said posts with said crate, said crate having upwardly and outwardly inclined front and rear walls, and doors at both ends thereof.

2. Weighing apparatus of the character described, comprising a horizontal frame having front, rear and side portions, a pair of front posts attached to the front corners of said horizontal frame, a bar interconnecting the upper ends of said posts, a pair of members fixed to said frame, adjacent the rear portion thereof, and having pointed upper ends, a horizontal V-shaped member disposed above said horizontal frame and having a pair of rearwardly and outwardly inclined arms, countersunk means adjacent the outer ends of said arms to receive the pointed ends of said pair of members, the apex of said V-shaped member being disposed beneath said bar, means on intermediate portions of said arms provided with pointed upper ends, weighing mechanism supported by said bar and connected to the apex portion of said V-shaped member, a crate having a bottom wall, front and rear, upwardly and outwardly inclined walls, and provided with doors at the ends thereof, means for supporting said crate on said second mentioned pointed means, and links interconnecting said crate with said posts.

3. Apparatus of the character described comprising a bottom frame, a pair of upstanding vertical posts on said frame, a bar interconnecting said posts and disposed above said frame, a horizontal V-shaped member having diverging arms, screws on said frame, members on said arms having sockets to receive the upper ends of said screws for pivotally connecting said member to said frame, weighing mechanism interconnecting the apex of said V-shaped member with said bar, a crate adapted to receive animals, bolts at intermediate points of said arms, said crate having sockets to receive the upper ends of said last mentioned bolts for supporting said crate on intermediate portions of said arms, and between the pivotal points of said arms and the apex of said member.

4. Apparatus of the character described comprising a bottom frame, a pair of upstanding vertical posts on said frame, a bar interconnecting said posts and disposed above said frame, a horizontal V-shaped member having diverging arms, screws on said frame, members on said arms having sockets to receive the upper ends of said screws for pivotally connecting said member to said frame, weighing mechanism interconnecting the apex of said V-shaped member with said bar, a crate adapted to receive animals, bolts at intermediate points of said arms, said crate having sockets to receive the upper ends of said last mentioned bolts for supporting said crate on intermediate portions of said arms, and between the pivotal points of said arms and the apex of said member, and links interconnecting said posts with said crate.

ANDREW A. VATER.
CHRISTIAN J. VATER.